Patented May 19, 1925.

1,538,840

UNITED STATES PATENT OFFICE.

ARTHUR J. MOXHAM, OF ODESSA, DELAWARE, ASSIGNOR TO ELECTRO COMPANY, A CORPORATION OF DELAWARE.

CHEMICALLY-PREPARED IRON-BEARING MATERIAL.

No Drawing. Original application filed August 14, 1922, Serial No. 581,908. Divided and this application filed November 14, 1924. Serial No. 749,936.

*To all whom it may concern:*

Be it known that I, ARTHUR J. MOXHAM, a subject of the King of Great Britain, residing at and whose post-office address is Odessa, in the county of New Castle and State of Delaware, have invented new and useful Improvements in Chemically-Prepared Iron-Bearing Materials, of which the following is a specification.

This application is a division of my application Serial No. 581,908, filed August 14, 1922.

My invention relates to the production of a novel material of manufacture adapted to be used as a basis for the manufacture of iron and steel and, if desired, also for the manufacture of manganese and other metals which are ordinarily found with the iron ingredients in many natural minerals, some of which are ordinarily known as iron ores, while others may not now be ordinarily recognized as such, although containing considerable iron. In all such minerals other metallic constituents are present in the mineral and there is also a large proportion of siliceous matter so combined with and adhering to the iron and other ingredients that they are not removable by any screening or washing or other mere mechanical treatment of the mineral, without excessive crushing or even pulverization.

Heretofore in the production of iron and steel by smelting operations, the ore has not been previously purified except by mechanical operations such as screening and washing, or by the flotation and haloid processes. The result has been that the silica and other foreign matter present is not all eliminated and this extraneous material must be melted with the ore. Generally there has to be added a fluxing material which is itself an added source of expense. Large expenditures for heating the non-ferrous components of the ore and the fluxing material are thus necessitated; the slag produced has little or no value; such non-ferrous portions of the ore as are not fluxed out become impurities in the iron and generally undesirable ones. Thus though there may be great quantities of non-ferrous metallic oxides or other metallic ingredients in the ores, whose metals are now much more valuable than iron, such metals are not only not recovered, but their presence in the ore adds to the expense of manufacturing iron and renders it inferior in quality.

Instead of using the natural mineral, with or without preliminary mechanical purification as a basis for the smelting operations, I chemically purify the natural mineral to obtain a material containing all the iron ingredients of the mineral together with the manganese contents and more or less of the other desired metallic constituents of the mineral, but substantially free of silica. This involves first treating the mineral chemically in such manner that the metallic constituents may be separated from the silica and other gangue and then, after such separation, treating the mass of mixed metallic salts to obtain the iron ingredients mixed with the manganese contents and other metallic constituents of the minerals as oxides or otherwise. These may be smelted together to reduce the oxide of iron as now customary or, preferably, further chemical reactions may be effected in order to make such additional separations as will be most desirable for separate manufacture of the different metals present or compounds thereof.

I believe that the product of my invention has not prior to my invention been obtained, or even seriously sought, because of the lack of knowledge that has existed as to the possibility that suitable chemical reactions could be effected satisfactorily and economically, but I have found that the chemically prepared material constituting my present invention can be prepared very economically, although with expensive reagents, because processes may be employed that enable the reagents to be reproduced for reuse in the same process, or, if desired, in more valuable form for sale as a separate product.

The essential characteristics of my novel product, as above set forth, may be embodied in products varying widely as to other specific metallic oxides which are mixed with the oxides of iron and manganese and as to the relative proportions of the different metallic oxides present, because these detailed characteristics will differ as the minerals to be treated differ. Moreover, variations of the chemical treatment given to the mineral may, in some cases, effect a partial separation of the metallic constituents of the mineral after they have been converted into salts and prior to their decomposition to become oxides again, in which case my product would not contain oxides of all, but only part of the metallic constituents of the mineral.

As specific examples of my product and particular chemical treatments by which it may be produced, I will assume a low grade iron ore containing ferric oxide and manganese oxide, a large percentage of silica, and also containing alumina and small percentages of other metallic ingredients, and I shall point out chemical treatments which may be given to such a mineral which will equally produce the products of my invention, though the products will not be specifically the same.

Such a mineral, after suitable crushing if desired, is subjected to a sulfuric acid leaching under conditions that will dissolve the several metallic constituents and maintain them in solution as sulfates, the iron being in the form of ferric sulfate. The silica remains undissolved and is separated by decantation or filtration. The silica should be thoroughly washed to avoid loss of the adhering solution. The water should then be driven off from the sulfate solution by heat or concentrated sulfuric acid, or both. At this point if the mixed salts are calcined at sufficiently high temperature, say, about 850° C., all the sulfates will be decomposed and the solid material resulting is free of silica and contains ferric oxide, manganese oxide, alumina, and oxides of such other metals as may be found in the particular ore and the treatment, the proportions of the different constituents being those of the natural mineral. It is substantially the original mineral chemically freed of its silica. This material may be acted upon in various ways to manufacture iron and steel as by using it (with some additional material for slag making purposes, if desired) in the blast furnace instead of iron ore, or by melting it directly with the necessary reducing agent, in the electric furnace, or it may be subjected to further chemical reactions to separate other metallic constituents for their manufacture and to lessen the amount of material to be melted in the iron making furnace as well as to eliminate impurities from the resulting iron and steel.

The calcining should be done in a closed rotary kiln so that the sulfuric acid gas driven off from the mixed salts can be collected and passed through sulfuric acid spray towers whereby concentrated sulfuric acid is recovered for use over again with a fresh batch of the mineral or for sale as a valuable by-product.

Another way in which my product, though specifically different, may be produced from the same mineral is by adding potash bearing material to the mineral before or during the leaching with sulfuric acid, and to so proportion the water and carry on the leaching so that the sulfate of alumina and sulfate of potash combine with water to form potash alum. In this case the solution of sulfates, after filtering from the silica, is cooled and the potash alum crystallizes out and is removed from the solution before the balance of water is driven off and the other now anhydrous sulfates are decomposed. By this method the potash and alumina sulfates are separately obtained and may be separated from each other by further operations and pure alumina obtained. I still, however, obtain my product, being composed of the iron and manganese of the original ore in the form of ferric and manganese oxides and certain other metallic constituents of the ore, the alumina being either partly or wholly removed.

It will be obvious from the foregoing that the material constituting my invention may vary widely in its specific composition. It is also obvious that the relative proportions of the iron and manganese oxides in the products can be made whatever is desired, as for example, by suitable mixture of the minerals to be treated. Whatever its specific composition, my novel material is one composed of a chemically produced mixture of oxides of iron and manganese and other metals such as are contained in an ore, but free of the silica thereof, and is the result of converting the oxides into salts and thereafter decomposing the salts. No existing mineral in its natural condition contains a mixture of such oxides without silica, except possibly as small pieces of unusually pure mineral which may occasionally be picked from large masses of the mineral, but such small scattered fragments have no practical value in the arts. Physically the product produced by the present process differs from previously existing materials, including minerals, in such manner as to readily distinguish it. When produced in comminuted form, its fineness is sufficient, at least in most cases, to distinguish it, and in addition its color, due to heating, is a further distinguishing characteristic. Perhaps the nearest in appearance to the fine product are the ground paint ores, especially if heat treated to change its color. When the product is in incinerated or semi-fused condition, it has a characteristic blue color due to the artificial heat which clearly distinguishes it from any known mineral or other artificial metallic compound now known. It is also obvious that my invention in its broader aspect is not limited to any particular process for producing it, it being only necessary that a natural mineral containing substantial percentages of iron and manganese is chemically treated in accordance with a process that will enable the silica to be removed economically, and the iron and manganese to be retained together as oxides of iron. More specifically, however, my invention includes a material whose oxides are those of decomposed salts chemically prepared by leaching a mineral.

The processes which I have briefly summarized in this specification are not claimed herein. They are more fully described in various applications of mine and of A. W. Davison, most of which have become patents since the filing of my said original application Serial No. 581,908. These are as follows:

Patents granted to me:—1,489,361 dated Apr. 8, 1924, and 1,489,362 dated April 8, 1924.

Patent granted to A. W. Davison:— 1,489,347, dated April 8, 1924.

Still copending applications of mine:— S. N. 540,828 filed March 3, 1922, and S. N. 577,452 filed July 25, 1922.

Having thus described my invention, what I desire to secure and protect by Letters Patent is:

1. A material suitable for the manufacture of iron and steel which is substantially free of silica and water and contains ferric oxide and oxides of manganese, resulting from the decomposition by heat of mixed sulfates chemically prepared from an iron ore.

2. A material suitable for the manufacture of iron, steel and manganese which is substantially free of silica and water and contains ferric oxide and oxide of manganese, resulting from the decomposition by heat of mixed sulfates chemically prepared from an iron ore.

3. A material suitable for the manufacture of iron and steel consisting of iron oxide, manganese oxide and other oxides substantially free of silica and water and obtained by treating an iron ore chemically to form salts of the metals from which the siliceous matter is readily separable and then decomposing the salts to convert them back to the oxides.

In testimony whereof, I have signed my name to this specification.

ARTHUR J. MOXHAM.